US008082667B2

(12) United States Patent
Kulesha (10) Patent No.: US 8,082,667 B2
(45) Date of Patent: Dec. 27, 2011

(54) APPARATUS AND METHODS FOR SECURING A FIRST STRUCTURAL MEMBER AND A SECOND STRUCTURAL MEMBER TO ONE ANOTHER

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 1244 days.

(21) Appl. No.: 11/756,266

(22) Filed: May 31, 2007

(65) Prior Publication Data
US 2008/0295334 A1    Dec. 4, 2008

(51) Int. Cl.
*B21D 47/00* (2006.01)
(52) U.S. Cl. ......... 29/897.3; 49/505; 403/335; 244/131; 244/132
(58) Field of Classification Search ............. 244/131, 244/132, 133; 248/201, 205.2, 218.4–219.4, 248/298.1; 403/169–178, 289, 333–338, 403/505; 52/217, 584.1, 698–715; 29/897.3
See application file for complete search history.

(56) References Cited

U.S. PATENT DOCUMENTS

| | | | | |
|---|---|---|---|---|
| 4,113,910 A * | 9/1978 | Loyd | ............................. | 428/162 |
| 4,206,895 A * | 6/1980 | Olez | ........................... | 244/123.3 |
| 4,299,871 A * | 11/1981 | Forsch | ........................... | 428/104 |
| 4,671,470 A * | 6/1987 | Jonas | ............................ | 244/119 |
| 5,472,290 A | 12/1995 | Hulls | | |
| 5,817,269 A * | 10/1998 | Younie et al. | ................... | 264/258 |
| 5,881,517 A * | 3/1999 | Prince et al. | ................. | 52/238.1 |
| 6,436,507 B1 | 8/2002 | Pannell | | |
| 6,718,713 B2 * | 4/2004 | McKague et al. | .......... | 52/309.13 |
| 6,821,368 B2 * | 11/2004 | Benson et al. | ................... | 156/92 |
| 6,874,543 B2 * | 4/2005 | Schmidt et al. | ........... | 139/383 R |
| 6,886,821 B2 * | 5/2005 | Eberle, III | ...................... | 269/133 |
| 6,964,723 B2 * | 11/2005 | Lindsay et al. | ............... | 156/285 |
| 7,521,108 B2 * | 4/2009 | Franklin et al. | ............... | 428/119 |
| 2003/0041948 A1 * | 3/2003 | Bersuch et al. | ................... | 156/91 |
| 2003/0066589 A1 | 4/2003 | Benson et al. | | |
| 2003/0196741 A1 * | 10/2003 | Burgess et al. | ................. | 156/92 |
| 2004/0023581 A1 | 2/2004 | Bersuch et al. | | |
| 2004/0051005 A1 * | 3/2004 | Bergmann | ..................... | 244/133 |

FOREIGN PATENT DOCUMENTS
EP    0245533    11/1987

OTHER PUBLICATIONS

International Search Report on corresponding PCT application (PCT/US2008/064157) from International Searching Authority (EPO) dated Oct. 22, 2008.
Written Opinion on corresponding PCT application (PCT/US2008/064157) from International Searching Authority (EPO) dated Oct. 22, 2008.

* cited by examiner

*Primary Examiner* — David Bryant
*Assistant Examiner* — Jacob Cigna
(74) *Attorney, Agent, or Firm* — Yee & Associates, P.C.

(57) ABSTRACT

Apparatus and methods for securing a first structural member and a second structural member to one another. In one embodiment a two-piece fitting is provided. The fitting includes a variable gap between attachment surfaces, enabling the fitting to accommodate structural members of variable thickness. The fitting also includes overlapping sections that provide increased resistance to pull-off loads and impact loads. The configuration of the fitting advantageously simplifies the assembly process and preserves the integrity of the adhesive to form a strong joint.

20 Claims, 5 Drawing Sheets

APPARATUS AND METHODS FOR SECURING A FIRST STRUCTURAL MEMBER AND A SECOND STRUCTURAL MEMBER TO ONE ANOTHER

BACKGROUND

1. Technical Field

The present disclosure relates to apparatus and methods for securing a first structural member and a second structural member to one another.

2. Description of Related Art

Figure 1:
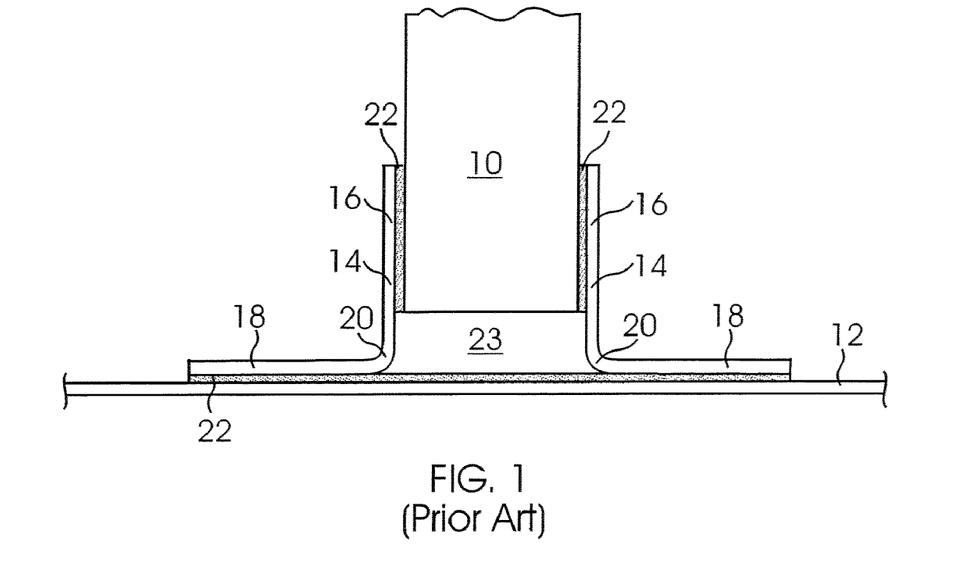
FIG. 1 is a front elevation detail view of a prior art method and apparatus for securing a first structural member and a second structural member to one another.

FIG. 1 illustrates one common method for securing a first structural member 1I and a second structural member 12 to one another. The first structural member 10 may be, for example and without limitation, a frame, a bulkhead, a cap or a rib. The second structural member 12 may be, for example and without limitation, a wing skin, a floor panel or a fuselage skin panel. First and second attachment angles 14 secure the structural members 10, 12 to one another. Each angle 14 comprises a first section 16 and a second section 18. The sections 16, 18 may be substantially planar, or may include some curvature. For simplicity, the sections 16, 18 are illustrated herein as being planar.

The sections 16, 18 are substantially perpendicular to one another and are joined at a radiused corner 20. The first section 16 of each angle 14 is secured to the first structural member 10, and the second section 18 of each angle is secured to the second structural member 12. In FIG. 1 adhesive 22 secures the mating surfaces to one another. However, other methods of attachment are also used, such as mechanical fasteners, bonding and co-bonding. In FIG. 1 a gap 23 is left between the first structural member 10 and the second structural member 12. The gap 23 may be filled with resin (not shown).

The method of attachment illustrated in FIG. 1 creates disadvantageous structural loading issues when pull-off loads are high. For example, pull-off loads create induced moments at the interfaces between the angles 14 and the second structural member 12 adjacent the radiused corners 20. These induced moments can cause the angles 14 to peel away from the second structural member 12. Also, impacts to the second structural member 12 in the area between the angles 14 can create fracture zones in the resin filling the gap 23. Cracks can propagate through the resin to the angles 14 causing debonding and bond failure.

Figure 2:
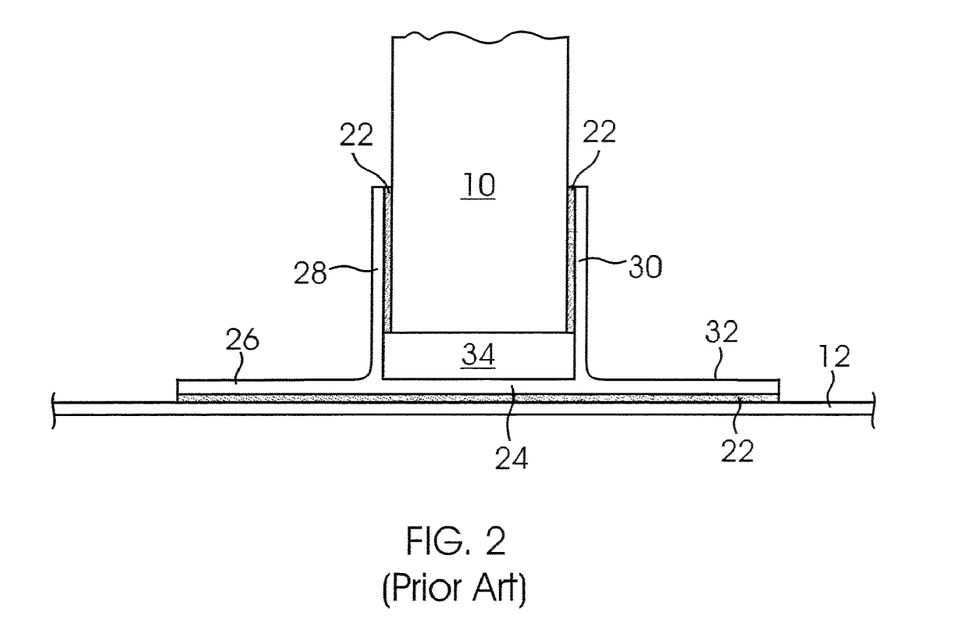
FIG. 2 is a front elevation detail view of another prior art method and apparatus for securing a first structural member and a second structural member to one another.

FIG. 2 illustrates another common method for securing a first structural member 10 and a second structural member 12 to one another. As shown, a single-piece Pi fitting 24 includes a first section 26. Second and third sections 28, 30 extend substantially perpendicularly from a first face 32 of the first section 26, making the Pi fitting 24 resemble the Greek letter "Pi". A space 34 between the second and third sections 28, 30 receives the first structural member 10. Adhesive 22 secures the first structural member 10 to inner faces of the second and third sections 28, 30. A second face of the first section 26 is secured to the second structural member 12 with adhesive 22. The space 34 may be filled with resin (not shown).

The one-piece Pi fitting 24 illustrated in FIG. 2 provides some structural advantages over the two-piece attachment angles 14 illustrated in FIG. 1. However, the Pi fitting 24 presents installation issues due to the fixed distance between the second and third sections 28, 30. For example, variances in the thickness of the first structural member 10 and/or in the distance between the second and third sections 28. 30 can cause the gap 34 to be too narrow to receive the first structural member 10, or cause the gap 34 to be so wide that it is not possible to adhere the first structural member 10 to both of the second and third sections 28, 30. Further, after applying adhesive 22 to the first structural member 10 and/or to the second and third sections 28, 30 it can be difficult to position the first structural member 10 between the second and third sections 28, 30 without disturbing the adhesive 22 and diminishing the structural integrity of the bonded area.

SUMMARY

The preferred embodiments of the present apparatus and methods have several features, no single one of which is solely responsible for their desirable attributes. Without limiting the scope of these apparatus and methods as expressed by the claims that follow, their more prominent features will now be discussed briefly. After considering this discussion, and particularly after reading the section entitled "Detailed Description of the Preferred Embodiments", one will understand how the features of the preferred embodiments provide advantages which include increased resistance to pull-off loads and impact loads, a relatively benign failure mechanism, allowance for thickness variations in the structural members, preservation of adhesive during installation, and reduced complexity in applying adhesive.

One embodiment of the present apparatus and methods comprises a fitting configured to secure a first structural member and a second structural member to one another. The fitting comprises a first piece including a first section and a second section. The first and second sections adjoin one another at a substantially perpendicular angle. The fitting further comprises a second piece including a third section, a fourth section and a fifth section. The third and fourth sections adjoin one another at a substantially perpendicular angle. The third and fifth sections adjoin one another at a substantially perpendicular angle. The fourth and fifth sections lie in substantially parallel, noncoinciding planes.

Another embodiment of the present apparatus and methods comprises a method of securing a first structural member and a second structural member to one another. The method comprises the steps of securing a first section of a first piece of a fitting to a first face of the first structural member, securing a third section of a second piece of the fitting to a second face of the first structural member opposite the first face securing a second section of the first piece to a fifth section of the second piece, and securing the second section and a fourth section of the second piece to the second structural member.

Another embodiment of the present apparatus and methods comprises a method of manufacturing an aircraft, the method including at least a pre-production phase and a production phase. The method comprises the steps of: designing the aircraft including subassemblies, and components therefor; specifying and procuring materials; fabricating the components from the materials; assembling the subassemblies by combining subsets of the components- and assembling the aircraft by combining subsets of the subassemblies. The step of assembling the subassemblies includes the step of securing a first structural member and a second structural member to one another. The step of securing the first structural member and the second structural member to one another includes the steps of: a) securing a first section of a first piece of a fitting to a first face of the first structural member; b) securing a third section of a second piece of the fitting to a second face of the first structural member opposite the first face; c) securing a second section of the first piece to a fifth section of the second piece; and d) securing the second section and a fourth section of the second piece to the second structural member.

BRIEF DESCRIPTION OF THE DRAWINGS

The preferred embodiments of the present apparatus and methods will now be discussed in detail with an emphasis on highlighting the advantageous features. These embodiments depict the novel and non-obvious apparatus and methods shown in the accompanying drawings, which are for illustrative purposes only. These drawings include the following figures, in which like numerals indicate like parts.

DETAILED DESCRIPTION

Figure 3:
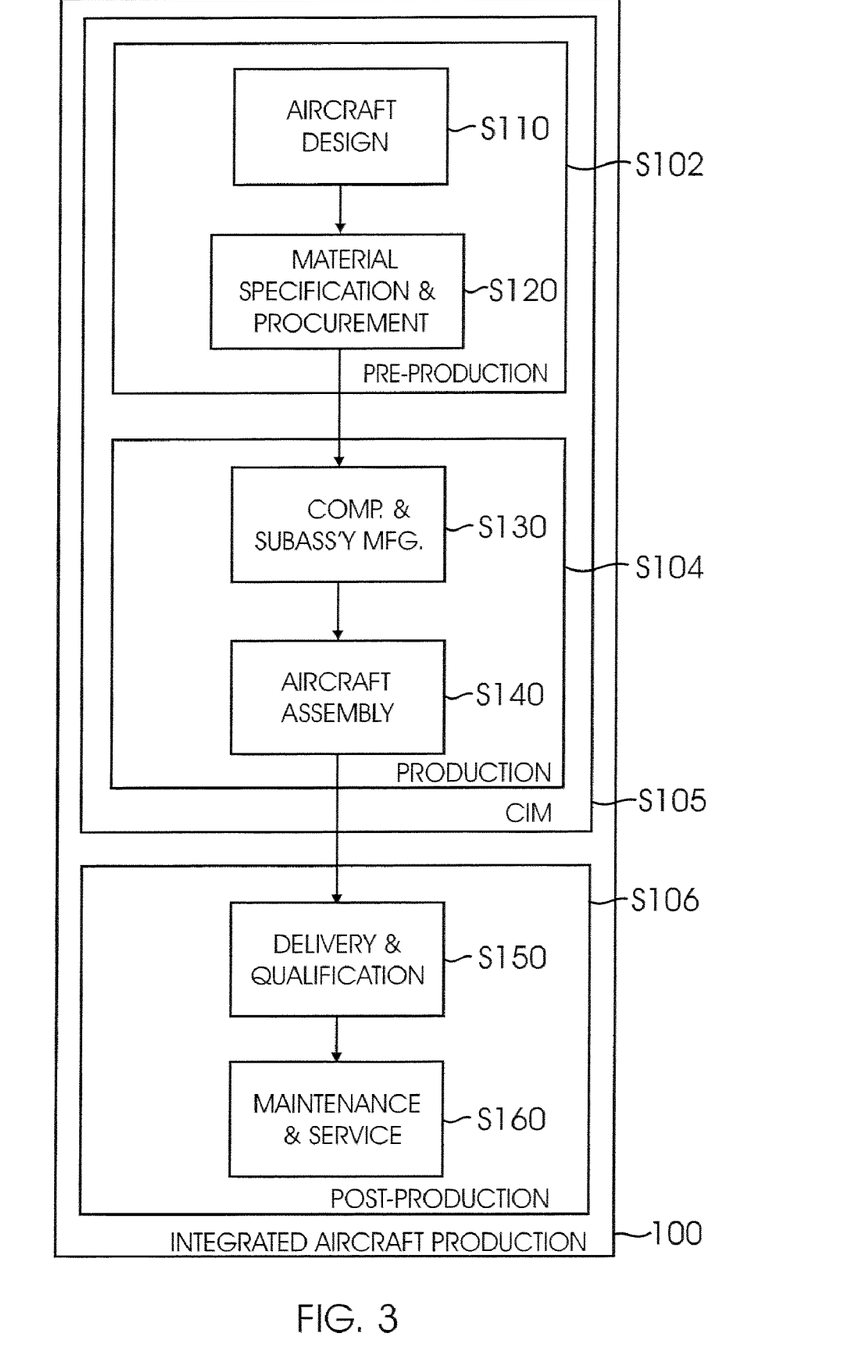
FIG. 3 is a flowchart illustrating steps in an integrated aircraft production process.

FIG. 3 illustrates an integrated aircraft production process 100, in accordance with embodiments of the present disclosure. As used herein, the integrated aircraft production process 100 also may include manufacturing, support, or both. Typically, the process 100 includes a pre-production phase (S102), a production phase (S104), and a post-production phase (S106). The pre-production phase S102 may include aircraft, subassembly, and component design (S110), and material specification and procurement (S120). Material specification and procurement (S120) may include selection and procurement of components fabricated, or subassemblies manufactured, by third parties. Examples of such third parties include, without limitation, vendors, subcontractors, and suppliers. The production phase S104 may include component fabrication and/or subassembly manufacturing (S130), and aircraft assembly (S140). The pre-production phase (S102) and production phase (S104) can be elements of an integrated manufacturing process (S105) including one or more of aircraft and component design, development, and simulation processes, material, component, and sub-assembly specification and procurement processes; automated production planning processes; fabrication and assembly processes; and quality control processes.

Frequently, aspects of a modern aircraft production process, such as the integrated process 100, do not end with final assembly, but may extend over the service life of an aircraft. These aspects may involve iterative and interactive collaborations between manufacturer, governmental authorities, customers and aircraft operators. Accordingly, the integrated production process 100 can include a post-production phase (S106). The post-production phase (S106) may include aircraft delivery and qualification (S150), and/or aircraft service (S160). The aircraft delivery and qualification (S150) may include providing an aircraft to customer specifications, which may have changed from the time the aircraft was assembled. Thus, delivery and qualification can include repair, modification, and/or revision of one or more elements of the aircraft after delivery to a customer or operator. Also, it may be desirable to perform a modification, a repair, or an upgrade to an aircraft in the service interval between aircraft delivery and retirement. Therefore, aircraft service S160 can include repair, modification, and/or upgrade of a portion of an airframe, including an airframe manufactured or assembled using traditional, pre-existing materials, components, and/or subassemblies.

Figure 4:
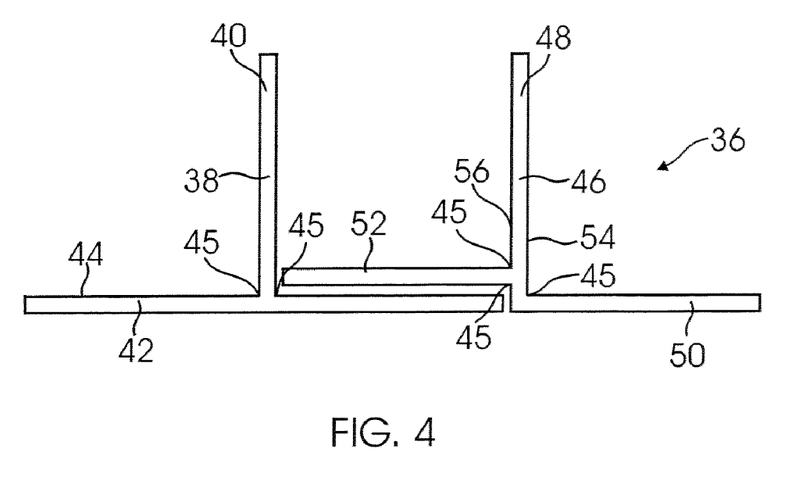
FIG. 4 is a front elevation detail view of one embodiment of the present apparatus for securing a first structural member and a second structural member to one another.

FIG. 4 illustrates one embodiment of the present apparatus for securing a first structural member and a second structural member to one another. The apparatus comprises a two-piece fitting 36. A first piece 38 includes a first section 40 and a second section 42. The sections 40, 42 may be substantially planar, or may include some curvature. For simplicity, the sections 40, 42 are illustrated herein as being planar. The first and second sections 40, 42 adjoin one another at a substantially perpendicular angle, with the second section 42 extending outward from approximately a center of a first face 44 of the first section 40. In the front elevation view shown in FIG. 4, the first piece 38 resembles the letter "T". In the illustrated embodiment, corners 45 of the junction between the first and second sections 40, 42 are not radiused. However, those of ordinary skill in the art will appreciate that the corners 45 may be radiused, similar to the corners 20 of the angles shown in FIG. 1.

A second piece 46 includes a third section 48, a fourth section 50 and a fifth section 52. The sections 46, 48, 50 may be substantially planar, or may include some curvature. For simplicity, the sections 46, 48, 50 are illustrated herein as being planar. The third and fourth sections 48, 50 adjoin one another at a substantially perpendicular angle, with the fourth section 50 extending outward from an end of a first face 54 of the third section 48. The third and fifth sections 48, 52 similarly adjoin one another at a substantially perpendicular angle, with the fifth section 52 extending outward from near an end of a second face 56 of the third section 48. The fourth and fifth sections 50, 52 extend in opposite directions from the third section 48, and lie in substantially parallel, noncoinciding planes. In the illustrated embodiment, corners 45 of the junctions between the third, fourth and fifth sections 48, 50, 52 are not radiused. However, those of ordinary skill in the art will appreciate that the corners 45 may be radiused, similar to the corners 20 of the angles shown in FIG. 1.

When the first and second pieces 38, 46 are arranged as shown in FIG. 4? with the fifth section 52 of the second piece 46 overlapping the second section 42 of the first piece 38, the fitting 36 closely resembles the one-piece Pi fitting 24 illustrated in FIG. 2 Advantageously, however, the present fitting 36 includes first and second pieces 38, 46 so that a distance between the first section 40 of the first piece 38 and the third section 48 of the second piece 46 is variable. The present fitting 36 is thus able to accommodate variations in the thickness of structural members, and can be adhered to a structural member without disturbing adhesive applied to either or both of the structural member and the first and second pieces 38, 46. Further advantages of the present two-piece fitting 36 are described in detail below.

Figure 5:
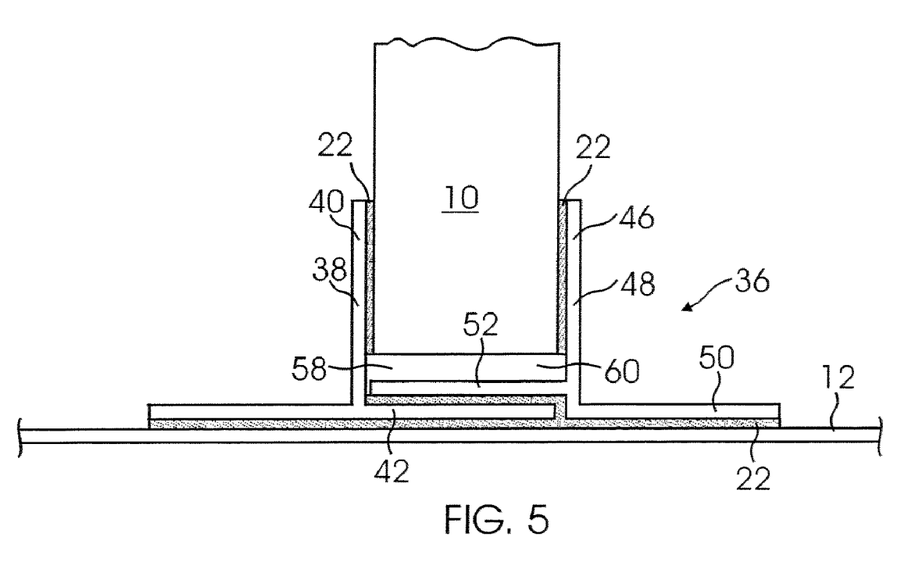
FIG. 5 is a front elevation detail view of one embodiment of the present apparatus and methods for securing a first structural member and a second structural member to one another.

FIG. 5 illustrates one embodiment of the present methods for securing a first structural member 10 and a second structural member 12 to one another using the fitting 36 shown in FIG. 4. The two pieces 38, 46 are arranged as they are in FIG. 4, with the fifth section 52 of the second piece 46 overlapping the second section 42 of the first piece 38. In this arrangement the first, third and fifth sections 40, 48, 52 form a cavity 58 that receives the first structural member 10. Adhesive 22 interposed between the fifth section 52 and the second section 42 secures the first and second pieces 38, 46 to one another. Adhesive 22 interposed between the second section 42 and the fourth section 50 and the second structural member 12 secures the first and second pieces 38,. 46 to the second structural member 12. Adhesive 22 interposed between the first section 40 and the first structural member 10, and between the third section 48 and the first structural member 10 secures the first and second pieces 38, 46 to the first structural member 10. In FIG. 5 a gap 60 is left between the first structural member 10 and the fifth section 52. The gap 60 may be filled with adhesive, tow and/or chopped fibers in order to increase the strength of the joint. Those of ordinary skill in the art will appreciate that the gap 60 need not be provided.

The attachment arrangement illustrated in FIG. 5 advantageously addresses the structural loading issues of the attachment angles 14 shown in FIG. 1. When pull-off loads are applied to the first structural member 10 the resultant forces at the junction of the first and second pieces 38, 46 and the second structural member 12 are applied over the whole combined length of the second section 42 and the fourth section 50. Thus, the tendency of the angles 14 (FIG. 1) to peel away from the second structural member 12 is greatly reduced in the arrangement illustrated in FIG. 5. Also, impacts to the second structural member 12 in the area between the first section 40 and the third section 48 are less likely to propagate into and/or through the material filling the gap 60 (if such material is provided). The space between the first structural member 10 and the second structural member 12 includes at least the second section 42, the fifth section 52 and adhesive 22. Thus, this area is stronger than the corresponding area of the apparatus of FIG. 1.

Advantageously, the various components in FIG. 5 can be secured to one another in any order. Thus, for example and without limitation, in a first step the first and second pieces 38, 46 of the fitting 36 may be secured to the first structural member 10 and to each other, and then in a second step the subassembly may be secured to the second structural member 12. Alternatively, in a first step the first piece 38 may be secured to the second structural member 12, and then in a second step the first structural member 10 may be secured to the first piece 38, and in a third and final step the second piece 46 may be secured to the first piece 38, to the first structural member 10 and to the second structural member 12.

Figure 6:
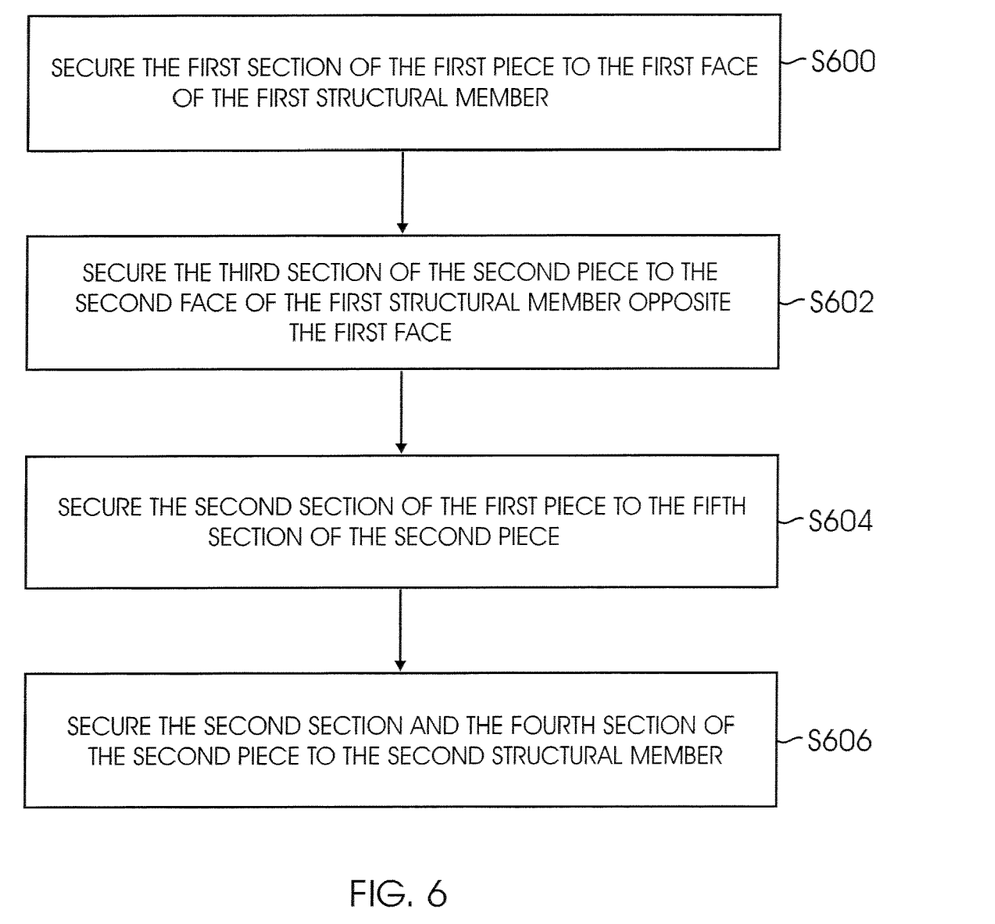
FIG. 6 is a flowchart illustrating steps in one embodiment of the present methods for securing a first structural member and a second structural member to one another.

FIG. 6 illustrates in greater detail one non-limiting example of a method for securing the first and second pieces 38, 46 and the first and second structural members 10, 12 to one another. In step S600 the first section 40 of the first piece 38 is secured to a first face of the first structural member 10. In step S602 the third section 48 of the second piece 46 is secured to a second face of the first structural member 10 opposite the first face. In step S604 the second section 42 of the first piece 38 is secured to the fifth section 52 of the second piece 46. In step S606 the second section 42 and the fourth section 50 of the second piece 46 are secured to the second structural member 12.

Figure 7:
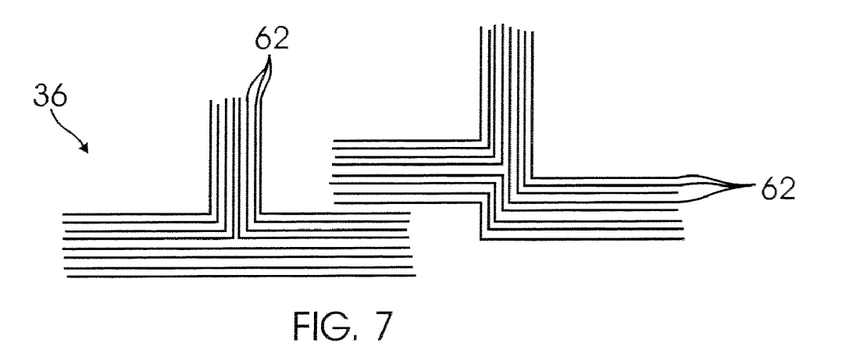
FIG. 7 is a front elevation detail view of another embodiment of the present apparatus for securing a first structural member and a second structural member to one another.

In one embodiment the first and second pieces 38, 46 of the present fitting 36 are constructed of composite materials. For example and without limitation, the composite material may include at least one layer, and in certain embodiments a plurality of layers, of a reinforcement material having a textile constriction. FIG. 7 illustrates one embodiment of the present fitting 36 comprising a plurality of layers 62. In FIG. 7 the spacing between adjacent layers has been exaggerated for clarity. The reinforcement material may be, but is not limited to, glass, polymer (such as aramid) and/or carbon, for example. Where the reinforcement material comprises multiple layers, different layers may comprise different materials. The matrix material may be a polymer, such as and without limitation, epoxy. The matrix may be either thermoset or thermoplastic.

In addition to the assembly options described above, the components may be secured to one another using a variety of different techniques, including without limitation bonding and co-bonding. For example, all of the components may be cured prior to assembly and then bonded together with adhesive. Alternatively, some or all of the components may be bonded to each other in a "B" stage, or partially cured stage. Various subassemblies, or the entire assembly, may then be cured together. Such co-bonding techniques may help to strengthen bonds between components while using less adhesive.

Figure 8:
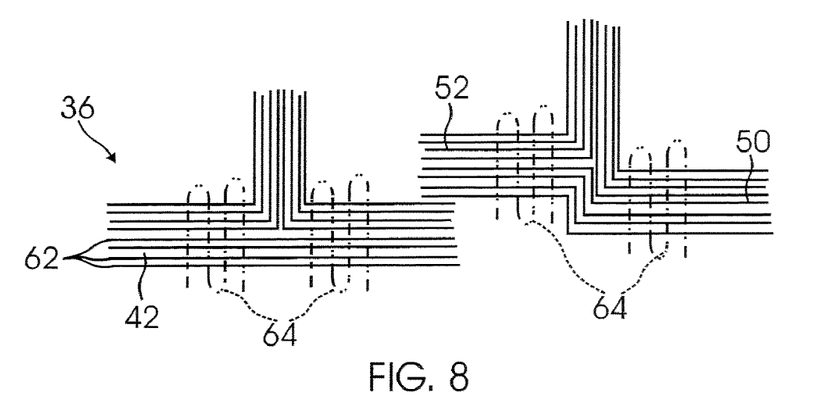
FIG. 8 is a front elevation detail view of another embodiment of the present apparatus for securing a first structural member and a second structural member to one another.

With reference to FIG. 8, in the multi-layer embodiments of the present fitting 36 stitching 64 and/or Z-pins (not shown) may be provided to reinforce the securement of the layers 62 to one another. FIG. 8 illustrates stitching 64 reinforcing the layers of the second section 42, fourth section 50 and fifth section 52. The stitching 64 may comprise, for example and without limitation, graphite thread, glass thread, polymeric thread or another type of thread. The stitching 64 reinforces the layers 62 by providing additional mechanical support to the adhesive support provided by the matrix material. Those of ordinary skill in the art will appreciate that stitching 64 and/or Z-pins may be provided on fewer or more of the sections than as shown in FIG. 8.

Figure 9:
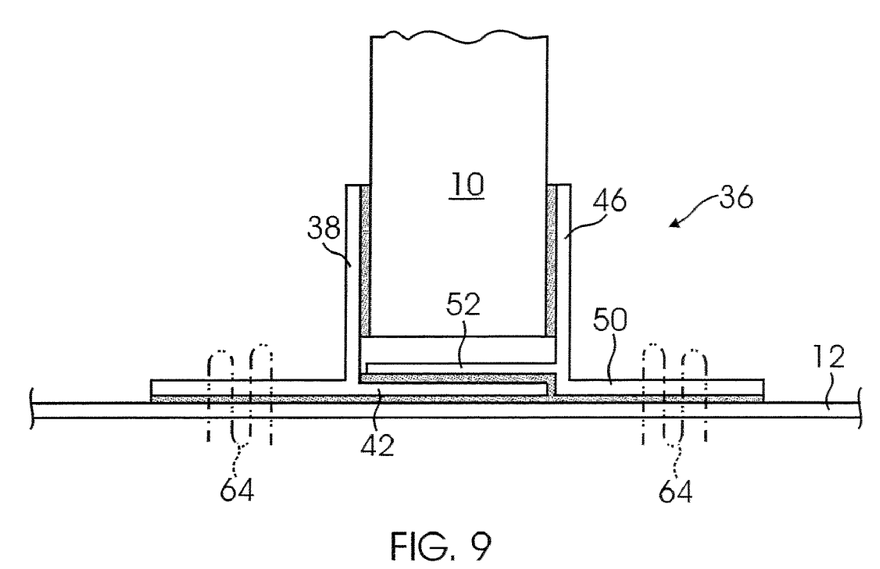
FIG. 9 is a front elevation detail view of one embodiment of the present apparatus and methods for securing a first structural member and a second structural member to one another.

With reference to FIG. 9, stitching 64 and/or Z-pins (not shown) may also reinforce the connections between the first and second pieces 38, 46 and the second structural member 12. Such stitching 64 may be provided in both the single-layer and the multi-layer embodiments of the present fitting 36. As illustrated, a first quantity of stitching 64 extends through the second section 42 and the second structural member 12, and a second quantity of stitching 64 extends through the fourth section 50 and the second structural member 12. The stitching 64 advantageously increases the pull-off strength of the joint by providing additional mechanical support. And in the multi-layer embodiments of the present fitting 36, the stitching 64 also reinforces the securement of the layers 62 to one another. Although not illustrated herein, stitching 64 and/or Z-pins may also be provided between the first and second pieces 38, 46 and the first structural member 10. Such stitching 64 and/or Z-pins advantageously increases the strength of the connection between the first structural member 10 and the present fitting 36. Further, although also not illustrated herein, stitching 64 and/or Z-pins may also be provided between the second section 42 and the fifth section 52 and/or between the second section 42, the fifth section 52 and the second structural member 12. Such stitching 64 and/or Z-pins advantageously increases the strength of the connection between the second and fifth sections 42, 52 and/or between the second section 42, the fifth section 52 and the second structural member 12.

The above description presents the best mode contemplated for carrying out the present apparatus and methods, and of the manner and process of making and using them in such full, clear, concise, and exact terms as to enable any person skilled in the art to which it pertains to make these apparatus and use these methods. These apparatus and methods are, however, susceptible to modifications and alternate constructions from that discussed above that are fully equivalent. Consequently, these apparatus and methods are not limited to the particular embodiments disclosed. On the contrary, these apparatus and methods cover all modifications and alternate constructions coming within the spirit and scope of the apparatus and methods as generally expressed by the following claims, which particularly point out and distinctly claim the subject matter of the apparatus and methods.

What is claimed is:

1. A fitting configured to secure a first structural member and a second structural member to one another, the fitting comprising:
    a first piece including a first section and a second section, the first piece comprising multiple layers of composite material and the second piece comprising multiple layers of composite material; the first and second sections adjoining one another at a substantially perpendicular angle;
    a second piece including a third section, a fourth section and a fifth section, the third and fourth sections adjoining one another at a substantially perpendicular angle, the third and fifth sections adjoining one another at a substantially perpendicular angle, and the fourth and fifth sections lying in substantially parallel, noncoinciding planes;
    the first and second pieces comprise composite material such that the first piece comprises multiple layers of reinforcement material extending to the first and second sections; and the second piece comprises multiple layers of reinforcement material extending to the third and fourth section, multiple layers of reinforcement material extending to the third and fifth sections, and multiple layers of reinforcement material extending to the fourth and fifth sections; and
    the second and fifth sections are configured to be secured to one another to form a cavity bounded by the first, third and fifth sections.

2. The fitting of claim 1, wherein the sections are substantially planar.

3. The fitting of claim 1, further comprising stitching or Z-pins configured to reinforce at least one of the first and second pieces.

4. The fitting of claim 1, wherein the composite material includes a polymer matrix.

5. The fitting of claim 4, wherein the composite material includes a reinforcement having a textile construction.

6. The fitting of claim 5, wherein at least one layer of the reinforcement includes fibers selected from the group consisting of glass, polymers and carbon.

7. A method of securing a first structural member and a second structural member to one another with a fitting so as to resist pull off forces on the fitting, the method comprising the steps of:
    a) securing a first section of a first piece of a fitting to a first face of the first structural member, the first piece comprising multiple layers of composite material;
    b) securing a third section of a second piece of the fitting to a second face of the first structural member opposite the first face, the second piece comprising multiple layers of composite material;
    c) securing a second section of the first piece to a fifth section of the second piece; and
    d) securing the second section of the first piece and a fourth section of the second piece to the second structural member;
    the first structural member is joined to the second structural member so as to resist pull off forces thereon; and
    the first and second pieces comprise composite material such that the first piece comprises multiple layers of reinforcement material extending to the first and second sections; and the second piece comprises multiple layers of reinforcement material extending to the third and fourth section, multiple layers of reinforcement material extending to the third and fifth sections, and multiple layers of reinforcement material extending to the fourth and fifth sections.

8. The method of claim 7, wherein the sections are substantially planar.

9. The method of claim 7, wherein step a) is performed prior to step b).

10. The method of claim 7, wherein step b) is performed prior to step a).

11. The method of claim 7, wherein the first structural member is a frame, a bulkhead, a cap or a rib, and the second structural member is a wing skin, a floor panel or a fuselage skin panel of an aircraft.

12. The method of claim 7, further comprising the steps of designing the fitting and the first and second structural members.

13. The method of claim 7, further comprising the step of selecting and procuring materials.

14. The method of claim 7, further comprising the steps of fabricating the fitting and the first and second structural members.

15. The method of claim 7, wherein the first and second structural members are secured to one another during a repair or improvement process.

16. The method of claim 7 wherein the first and second pieces comprise composite material such that the first piece comprises multiple layers of reinforcement material extending to the first and second sections; and the second piece comprises multiple layers of reinforcement material extending to the third and fourth section, multiple layers of reinforcement material extending to the third and fifth sections, and multiple layers of reinforcement material extending to the fourth and fifth sections.

17. A fitting and structural member assembly for resisting pull off forces, the assembly comprising:
    a first structural member defining a thickness;
    a second structural member;
    a first fitting component, the first fitting component comprising a first section and a second section, the first section and second section are substantially planar, the first section and the second section adjoining in a substantially normal configuration, the first section and the second section of the first fitting component comprising a plurality of layers of composite material, and the second section of the first fitting component further comprising a plurality of layers of composite material in a substantially planar configuration;
    a second fitting component, the second fitting component comprising a third section, a fourth section, and a fifth section, the third section, the fourth section, and the fifth section are substantially planar;

the first fitting component comprising multiple layers of reinforcement material extending to the first and second sections; and the second fitting component comprising multiple layers of reinforcement material extending to the third and fourth section, multiple layers of reinforcement material extending to the third and fifth sections, and multiple layers of reinforcement material extending to the fourth and fifth sections;

wherein the first fitting component and the second fitting component are joined so as to form a cavity having a width that accommodates the thickness of the first structural member, such that the first structural member is partially disposed in the cavity; and wherein the first fitting component and the second fitting component are joined to the second structural member.

18. The assembly of claim 17, wherein the composite material includes a polymer matrix.

19. The fitting of claim 18, wherein the composite material includes a reinforcement having a textile construction.

20. The fitting of claim 19, wherein at least one layer of the reinforcement includes fibers selected from the group consisting of glass, polymers and carbon.

* * * * *